US011925854B2

(12) United States Patent
Ito et al.

(10) Patent No.: US 11,925,854 B2
(45) Date of Patent: Mar. 12, 2024

(54) INFORMATION PROCESSING APPARATUS, METHOD FOR CONTROLLING THE SAME, AND PROGRAM

(71) Applicant: SONY INTERACTIVE ENTERTAINMENT INC., Tokyo (JP)

(72) Inventors: Tomohito Ito, Kanagawa (JP); Naoyuki Saito, Tokyo (JP); Hideyuki Uchida, Ibaraki (JP); Nicolas Doucet, Kanagawa (JP); Masayuki Yamada, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 404 days.

(21) Appl. No.: 17/293,717

(22) PCT Filed: Nov. 27, 2019

(86) PCT No.: PCT/JP2019/046444
§ 371 (c)(1),
(2) Date: May 13, 2021

(87) PCT Pub. No.: WO2020/111155
PCT Pub. Date: Jun. 4, 2020

(65) Prior Publication Data
US 2021/0346792 A1 Nov. 11, 2021

(30) Foreign Application Priority Data
Nov. 30, 2018 (JP) .................................. 2018-225612

(51) Int. Cl.
*A63F 13/218* (2014.01)
*A63F 13/285* (2014.01)

(52) U.S. Cl.
CPC .......... *A63F 13/218* (2014.09); *A63F 13/285* (2014.09)

(58) Field of Classification Search
CPC ........... A63F 13/285; A63F 13/42; G06F 3/01
(Continued)

(56) References Cited

U.S. PATENT DOCUMENTS 9,895,606 B1 * 2/2018 Kamata ................. A63F 13/428
2006/0256081 A1 * 11/2006 Zalewski .............. G06F 3/0325
345/156
(Continued)

FOREIGN PATENT DOCUMENTS

JP 2009139724 A 6/2009
WO 2016051986 A1 4/2016
(Continued)

OTHER PUBLICATIONS

International Search Report and Written Opinion dated Feb. 25, 2020, from PCT/JP2019/046444, 9 sheets.
(Continued)

*Primary Examiner* — Pierre E Elisca
(74) *Attorney, Agent, or Firm* — XSENSUS LLP (57) ABSTRACT

Provided is an information processing apparatus that is to be connected to a controller apparatus including a push-button, a force sense presentation section, and the push-button. The push-button moves between a first position and a second position when depressed by a finger of a user. The force sense presentation section presents a force sense to the push-button. The information processing apparatus determines, according to a prescribed force sense setting, the aspect of a force sense to be imparted to the push-button, and controls the force sense presentation section of the controller apparatus, according to the determination. Each time a predefined operation is performed, the information processing apparatus changes the force sense setting from a current force sense setting to a different force sense setting.

13 Claims, 3 Drawing Sheets

(58) Field of Classification Search
USPC .......................................................... 463/37
See application file for complete search history.

(56) References Cited

U.S. PATENT DOCUMENTS

| | | | | |
|---|---|---|---|---|
| 2008/0096654 A1* | 4/2008 | Mondesir | .............. | A63F 13/213 |
| | | | | 463/31 |
| 2008/0100825 A1* | 5/2008 | Zalewski | ................ | A63F 13/42 |
| | | | | 356/28 |
| 2009/0258686 A1* | 10/2009 | McCauley | .............. | A63F 13/44 |
| | | | | 463/43 |
| 2011/0124410 A1* | 5/2011 | Mao | ...................... | A63F 13/211 |
| | | | | 463/31 |
| 2013/0084981 A1* | 4/2013 | Zalewski | .............. | A63F 13/211 |
| | | | | 463/36 |
| 2017/0182418 A1* | 6/2017 | Rogers | ................ | A63F 13/2145 |
| 2019/0332174 A1* | 10/2019 | Nakagawa | ............ | A63F 13/424 |

FOREIGN PATENT DOCUMENTS

| | | |
|---|---|---|
| WO | 2017150129 A1 | 9/2017 |
| WO | 2018020778 A1 | 2/2018 |

OTHER PUBLICATIONS

International Preliminary Report on Patentability dated Jun. 10, 2021, from PCT/JP2019/046444, 14 sheets.

* cited by examiner

| AMOUNT OF DEPRESSION | REACTION FORCE |
|---|---|
| P0 to P1 | $a$ ($a$ IS CONSTANT) |
| P1 to Pmax | $\beta \sin(\omega t)$ ($\beta$ AND $\omega$ ARE CONSTANTS) |

INFORMATION PROCESSING APPARATUS, METHOD FOR CONTROLLING THE SAME, AND PROGRAM

TECHNICAL FIELD

The present invention relates to an information processing apparatus, a method for controlling the information processing apparatus, and a program.

BACKGROUND ART

In recent years, controller apparatuses (apparatuses designed to have, for example, a joystick, receive instructions from a user, and transmit the received instructions to information processing apparatuses) that are used by connecting them to the information processing apparatuses, such as home video game consoles, are highly functional and able to achieve relatively high-precision acquisition of information regarding analog values, such as the amounts of depression and tilt of a switch, and supply the information to the information processing apparatuses.

SUMMARY

Technical Problem

Under the above-described background, it is now demanded that the quality of experiences on the controller apparatuses be improved by performing various processes through the use of the information received from the above-mentioned highly functional controller apparatuses.

Solution to Problem

In order to solve the problems with the above-mentioned conventional example, according to an aspect of the present invention, there is provided an information processing apparatus. The information processing apparatus is to be connected to a controller apparatus including a push-button and a force sense presentation section. When depressed by a finger of a user, the push-button moves between a first position and a second position. The force sense presentation section presents a force sense to the push-button. The information processing apparatus includes determination means, force sense control means, and setting change means. Based on a prescribed force sense setting, the determination means determines an aspect of a force sense to be imparted to the push-button. The force sense control means controls the force sense presentation section of the controller apparatus, according to the determination made by the determination means. Each time a predefined operation of changing the force sense setting is performed, the setting change means changes the force sense setting to be used by the determination means from a current force sense setting to a different force sense setting.

Advantageous Effect of Invention

Consequently, the present invention is able to improve the quality of experiences on the controller apparatus.

DESCRIPTION OF EMBODIMENT

Figure 1:
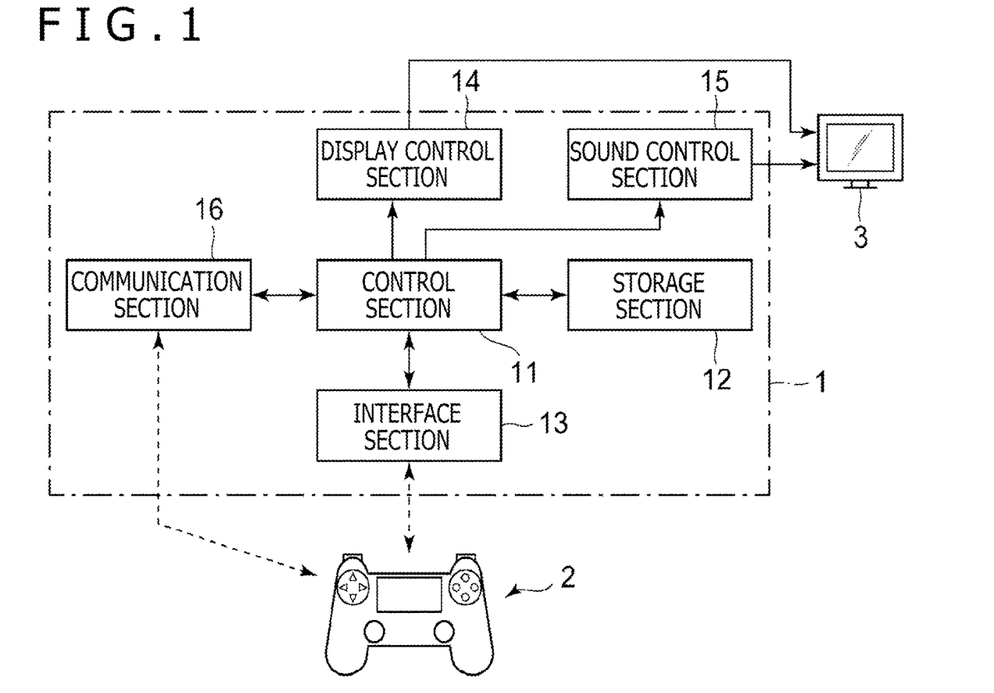
FIG. 1 is a block diagram illustrating an example of a configuration and connection of an information processing apparatus according to an embodiment of the present invention.

An embodiment of the present invention will now be described with reference to the accompanying drawings. As illustrated in FIG. 1, an information processing apparatus 1 according to the embodiment of the present invention includes a control section 11, a storage section 12, an interface section 13, a display control section 14, a sound control section 15, and a communication section 16. Further, the information processing apparatus 1 is communicatively connected wiredly or wirelessly to a controller apparatus 2. Further, the information processing apparatus 1 is connected to a display apparatus 3 such as a display. The display apparatus 3 may include a speaker that outputs a sound.

Figure 2:
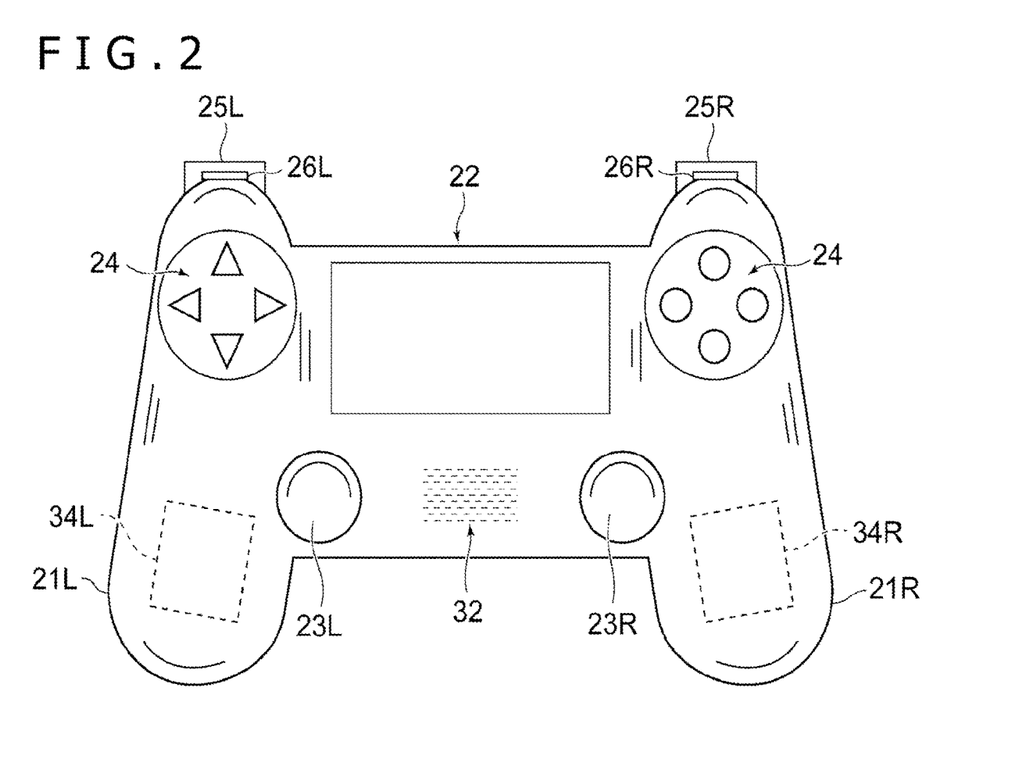
FIG. 2 is a plan view illustrating an overview example of a controller apparatus that is to be connected to the information processing apparatus according to the embodiment of the present invention.

As illustrated in FIG. 2, the controller apparatus 2 to be connected to the information processing apparatus 1 according to the present embodiment includes, for example, grip sections 21L and 21R and a main body section 22. The grip sections 21L and 21R are grippable by both hands of a user, attached respectively to the left and right sides of a housing, and gripped respectively by the left and right hands when the user operates the controller apparatus 2 under normal conditions. The main body section 22 is coupled to the grip sections 21L and 21R. Further, tiltable joysticks 23L and 23R and a plurality of buttons 24 are disposed on portions of the main body section 22 that are respectively reached by the thumbs of the left and right hands of the user while the grip sections 21 are gripped by the left and right hands of the user.

Further, swing switches 25L and 25R of a push-button type are disposed on portions of a rear lateral surface of the main body section 22 that are respectively reached by the middle fingers of the left and right hands of the user while the grip sections 21 are gripped by the left and right hands of the user. Moreover, buttons 26L and 26R are disposed on portions that are respectively reached by the index fingers of the left and right hands of the user while the grip sections 21 are gripped by the left and right hands of the user. When the grip sections 21L and 21R, the joysticks 23L and 23R, the swing switches 25L and 25R, and the buttons 26L and 26R need not be distinguished between the left and right ones in the subsequent description, they are designated by omitting the letters L and R, for example, by using the expression "swing switch 25."

The configuration and layout of the above-mentioned joysticks, buttons, and switches are merely examples. Some other operating controls, such as switches and buttons, may be disposed on the controller apparatus 2. Further, in the subsequent description of the present embodiment, for example, the sizes, ratios, and layout of various sections are merely examples. The present embodiment is not limited to the sizes, ratios, and layout depicted here.

Figure 3:
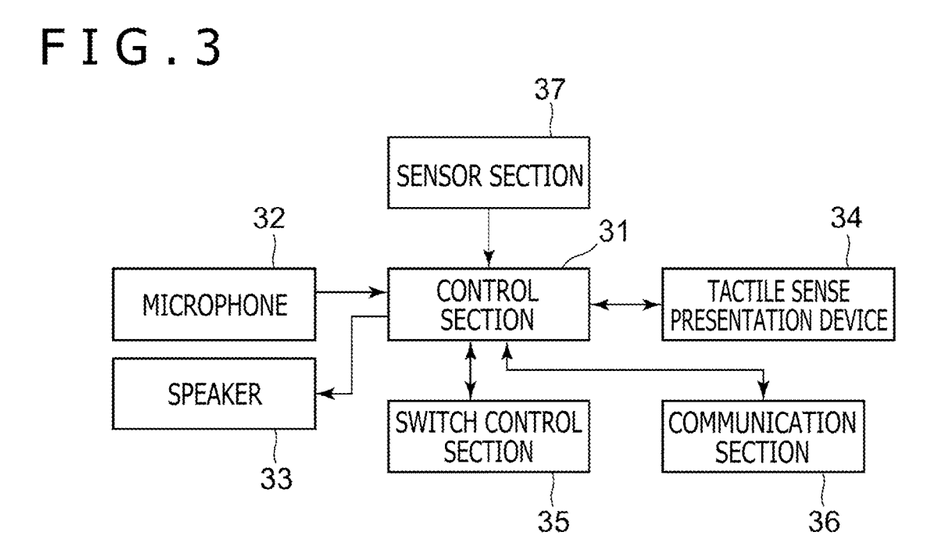
FIG. 3 is a block diagram illustrating an example of a configuration of the controller apparatus that is to be connected to the information processing apparatus according to the embodiment of the present invention.

Further, as illustrated in FIG. 3, a control section 31, a microphone 32, a speaker 33, a tactile sense presentation device 34, a communication section 36, and a sensor section 37 are included in the controller apparatus 2.

First of all, the configuration of various sections of the controller apparatus 2 will be described. In the present embodiment, the swing switch 25 includes a switch cover 250 and a support 252. The support 252 is able to rotate the switch cover 250 with respect to the housing of the controller apparatus 2. More specifically, the support 252 supports the switch cover 250 so that the switch cover 250 is rotatable within a predetermined angular range around a predetermined rotation shaft 251 disposed on the housing of the controller apparatus 2.

The subsequent description assumes that the predetermined angular range is the range where the switch cover 250 of the swing switch 25 swings between a first position and a second position. The first position is the most outward position protruding from the housing. The second position is a depressed inward position in the housing.

Further, it is assumed that the switch switches 25 are pushed outward from the controller apparatus 2, for example, with an elastic body. That is to say, while the swing switch 25 is not operated by the user, the swing switch 25 is moved to the first position which is the most outward protruding position.

Further, in the present embodiment, a rotary encoder 37R is disposed on the rotation shaft 251 of the support 252, which supports the swing switch 25. The rotary encoder 37R, which is used as a sensor included in the sensor section 37, detects the rotation angle of the swing switch 25 as information indicating the swing position (depressed position) of the swing switch 25, and outputs the detected rotation angle to the control section 31.

Moreover, the swing switch 25 additionally functions as a device capable of presenting a force sense. An operation performed for force sense presentation will be described later.

The control section 31 of the controller apparatus 2 is a program control device such as a microcomputer. The control section 31 operates in accordance with a program stored in a memory included in the control section 31. The control section 31 in the present embodiment processes a sound signal inputted from the microphone 32, and sounds the speaker 33 in accordance with an instruction received, for example, from the information processing apparatus 1.

Further, the control section 31 controls the tactile sense presentation device 34 in accordance with an instruction received, for example, from the information processing apparatus 1, and presents a tactile sense to the user. Further, the control section 31 controls a force sense presentation device in the swing switch 25 so as to present a reaction force (a force against depression) with respect to a depression operation of the user. Moreover, the control section 31 acquires information indicating user operations performed on the joystick 23, the button 24, and the swing switch 25 (e.g., the amount of depression of the swing switch 25), for example, from each of various buttons and sensor section 37, and transmits the acquired information to the information processing apparatus 1 through the communication section 36. The operations performed by the control section 31 will be described in detail later.

The microphone 32 generates a sound signal corresponding to a sound in the vicinity of the controller apparatus 2, and outputs the generated sound signal to the control section 31. The speaker 33 receives a sound waveform inputted from the control section 31, and sounds the received sound waveform.

The tactile sense presentation device 34 is, for example, a voice coil motor (VCM) or a vibrator. In accordance with an instruction inputted from the control section 31, the tactile sense presentation device 34 generates a vibration based on a vibration waveform indicated by the inputted instruction, and presents a tactile sense, such as a vibration, to the user gripping the controller apparatus 2. The tactile sense presentation device 34 in the present embodiment may be disposed on each of the grip sections 21L and 21R and controlled on an individual basis (depicted as tactile sense presentation devices 34L and 34R in FIG. 2). Adopting such a configuration makes it possible to present different tactile senses to the left and right hands of the user.

The communication section 36 is, for example, a universal serial bus (USB) interface, a network interface, or a Bluetooth (registered trademark) interface. The communication section 36 establishes wired or wireless communication with the information processing apparatus 1, receives, for example, an instruction transmitted from the information processing apparatus 1, and outputs the received instruction or the like to the control section 31. Further, in accordance with an instruction inputted from the control section 31, the communication section 36 transmits information designated by the inputted instruction to the information processing apparatus 1.

The sensor section 37 includes at least one sensor. As mentioned earlier, the sensor includes, for example, the rotary encoder 37R attached to the rotation shaft of the swing switch 25. Further, the sensor section 37 may include a tilt sensor that detects the tilt of the controller apparatus 2 itself. It is assumed that the tilt sensor detects, for example, the rotation angles around X-, Y-, and Z-axes with respect to the left-right direction (regarded as the X-axis direction), the front-rear direction (regarded as the Y-axis direction), and a direction orthogonal to planes formed by the X- and Y-axes (perpendicular direction, regarded as the Z-axis direction) that are directions relative to the controller apparatus 2, and then outputs the detected rotation angles.

[Force Sense Presentation]

A process of controlling the tactile sense presentation device 34 and a detailed process of force sense presentation to the swing switch 25 are performed by the control section 31, as described below. The control section 31 in the present embodiment receives control information regarding the tactile sense presentation device 34, for example, from the information processing apparatus 1. Specifically, the control information regarding the tactile sense presentation device 34 is information regarding a vibration waveform. Based on the information regarding the vibration waveform received from the information processing apparatus 1, the control section 31 controls the tactile sense presentation device 34. More specifically, the control section 31 causes the tactile sense presentation device 34, such as a voice coil motor or a vibrator, to present a vibration corresponding to the vibration waveform, by supplying a voltage corresponding to the amplitude of the vibration waveform to the tactile sense presentation device 34. It should be noted that the control section 31 may receive information regarding a plurality of vibration waveforms from the information processing apparatus 1. In such an instance, the control section 31 generates a vibration waveform (a combined vibration waveform) for controlling the tactile sense presentation device 34, by combining (averaging) the plurality of vibration waveforms, and controls the tactile sense presentation device 34 to present the combined vibration waveform.

Further, the control section 31 receives, from the information processing apparatus 1, an instruction for controlling a force sense presentation section of the swing switch 25. This instruction varies with the structure of the swing switch 25 (the configuration for imparting a reaction force). Therefore, the subsequent description is given below according to the configuration.

In an example of the present embodiment, the rotary encoder 37R and a braking apparatus may be disposed on the rotation shaft 251 of the swing switch 25 (each of the left and right swing switches 25L and 25R) in order to present the reaction force by braking the rotation of the swing switch 25 in accordance with an instruction that is inputted from the control section 31 according to the amount of rotation (corresponding to the amount of depression of the swing switch 25) detected by the rotary encoder 37R.

In the above example, the braking apparatus is controlled by the control section 31. That is to say, the above example assumes that the strength of braking by the braking apparatus can be controlled in accordance with the instruction inputted from the control section 31. A device having a widely known configuration of a swing switch capable of presenting a force sense can be adopted for the above purpose. Therefore, a detailed description is omitted here.

In the above example, the control section 31 transmits, to the information processing apparatus 1, information regarding the amount of depression of the swing switch 25 that is detected by the rotary encoder 37R. Then, the control section 31 may receive information regarding the strength of braking transmitted from the information processing apparatus 1 according to the information regarding the amount of depression of the swing switch 25, and control the braking apparatus according to the strength of braking prescribed by the received information. In the above example of the present embodiment, the braking apparatus corresponds to the force sense presentation section.

Further, the control section 31 may receive, in advance, from the information processing apparatus 1, information prescribing the relation between the strength of braking and the amount of depression of the swing switch 25. This information may prescribe a function that indicates the strength of braking according to, for example, the range of amount of depression. More specifically, this information should prescribe as indicated below.

Amount of depression of 0 to 3 degrees: Prescribes $\alpha \cdot P$ as the strength of braking according to the amount of depression P (prescribes $\alpha$ as a constant).

Amount of depression of 3 to 5 degrees: Prescribes $\beta$ as the strength of braking according to the amount of depression P (prescribes $\beta$ as a constant).

. . . .

As prescribed by this information, the control section 31 references the amount of depression of the swing switch 25 detected by the rotary encoder 37R, and computes the strength of braking at the current point of time, for example, by substituting (if necessary) a value indicating the current amount of depression into the function prescribed based on the referenced amount of depression. Then, the control section 31 controls the braking apparatus by using the computed strength of braking.

Based on the amount of depression, the control section 31 repeatedly controls the braking apparatus at predetermined time intervals (e.g., at 1/60-second or other periodic time intervals). This causes the user to receive a presented force sense that varies with the amount of depression of the swing switch 25.

Further, the above example of the present embodiment is merely illustrative and not restrictive. As an alternative, an actuator for exercising movement control to push the swing switch 25 outward from the inside may be used for force sense presentation of the swing switch 25.

Figure 4:
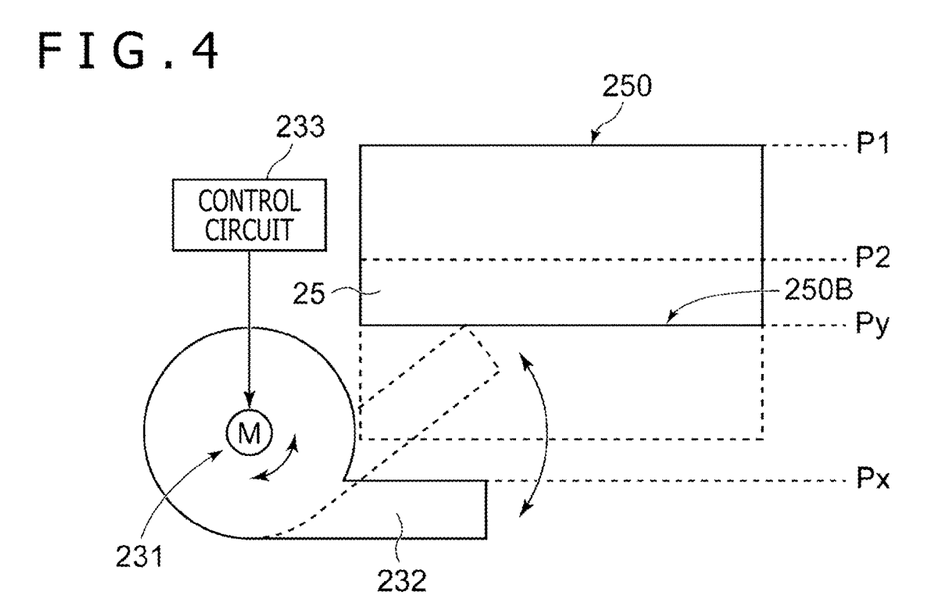
FIG. 4 is a diagram illustrating an example of a force sense presentation structure in the controller apparatus that is to be connected to the information processing apparatus according to the embodiment of the present invention.

An example structure for a case where an actuator is used as the force sense presentation section will now be described. In this case, as illustrated in FIG. 4, the swing switches 25L and 25R on the controller apparatus 2 each include an actuator 231 and an arm 232 as the force sense presentation section. The arm 232 is rotated by the actuator 231. Here, the arm 232, which is attached to the rotation shaft of the actuator 231, rotates within a predetermined angular range around the rotation shaft regarded as the center axis of rotation.

Further, the arm 232 is disposed to be able to move between an out-of-range position Px and a predetermined restriction position Py. The out-of-range position Px is where the leading end of the arm 232 is positioned outside the range of movement of a bottom surface 250B of the switch cover 250 of the swing switch 25 (the bottom surface 250B is the inner surface of the housing, and its normal line is parallel or substantially parallel (within a predetermined angular range from being parallel) to the direction of depression). The predetermined restriction position Py is on the movement path of the switch cover 250 when the swing switch 25 is depressed by the user, and used to restrict the range of movement of the swing switch 25.

The actuator 231 includes a rotation shaft and controls the position of the leading end of the arm 232 by rotating the rotation shaft in a direction prescribed by an instruction inputted from the control section 31. More specifically, the actuator 231 prescribes a point P between the above-mentioned positions Px and Py as a target position of the leading end of the arm 232, and controls the direction and speed of rotation of the rotation shaft as needed to place the leading end of the arm 232 at the target position. Further, in a case where the arm 232 does not move toward the target position due to a user operation (i.e., due to a force applied by the user), the actuator 231 controls the rotation of the arm 232 via the rotation shaft, according to information regarding a resistance force (stiffness) that indicates the force (resistance force) for rotating the rotation shaft toward the prescribed target position. Alternatively, the rotation of the actuator 231 may be controlled so as to present a predetermined resistance force. In such an alternative case, the control section 31 may successively change the target position of the arm 232 by varying the magnitude of reaction force to be presented to the user. That is to say, no matter what method is used, the present embodiment simply requires that a prescribed resistance force is presented to the user. Further, the control section 31 may control the actuator 231 in such a manner that the presented reaction force monotonically increases with an increase in the amount of depression of the swing switch 25. For example, the control section 31 may control the actuator 231 to impart such a reaction force that the user feels as if the user is in touch with an elastic body.

According to the example of the force sense presentation device configured as described above, the target position of the leading end of the arm 232 is a position P where the range of movement of the swing switch 25 is restricted. Thus, when the swing switch 25 is at the first position, the arm 232 does not come into contact with the bottom surface of the switch cover 250 of the swing switch 25. Thus, when the swing switch 25 is being depressed, the user is able to operate the swing switch 25 with a relatively light force (a force sufficient to resist a pressing force applied in a direction of moving the swing switch 25 to the first position) until the bottom surface of the switch cover 250 reaches the position P.

Meanwhile, when the bottom surface of the switch cover 250 of the swing switch 25 is depressed to the position P, the arm 232 comes into contact with the bottom surface of the switch cover 250. In order to further depress the swing switch 25 in this instance, the user needs to depress the swing switch 25 with a relatively strong force against the resistance force (stiffness) of the actuator 231 that attempts to move the leading end of the arm 232 toward the position P (for the purpose of keeping the leading end of the arm 232 at the position P). In this manner, the actuator 231 is used to present the user with a force sense representing a reaction force (torque) against the force of depressing the swing switch 25.

In a case where control is exercised based on the control information designating the target position as the position P with respect to the position to which the swing switch 25 is depressed, as described above, the magnitude of the presented resistance force is substantially "0" before the swing switch 25 is depressed to the position P, and is equal to the prescribed magnitude when the position P is exceeded by the position to which the swing switch 25 is depressed.

In the above example, the control section 31 controls the actuator 231 according to the control information inputted from the information processing apparatus 1 and the result of rotation angle detection that is outputted from the rotary encoder 37R. Specifically, the control information outputted from the information processing apparatus 1 includes information regarding the rotation angle of the actuator 231 that corresponds to the target position of the leading end of the arm 232.

When the control information is inputted from the information processing apparatus 1, the control section 31 controls the direction and speed of rotation of the actuator 231 (e.g., a current to be supplied to the actuator 231), according to the information regarding the rotation angle of the actuator 231 that is included in the control information and the result of rotation angle detection that is outputted from the rotary encoder 37R. This control can be exercised by performing general feedback control and will thus not be described in detail here.

Further, at predetermined time intervals, the control section 31 references the result of rotation angle detection that is outputted from the rotary encoder 37R. Then, in a case where the rotation angle detected by and outputted from the rotary encoder 37R does not reach an angle corresponding to the target position within a predetermined period of time after the start of control based on the inputted control information, in spite of rotation direction/rotation speed control, the control section 31 may control the direction and speed of rotation (e.g., the current to be supplied to the actuator 231), instead of exercising feedback control, in order to present a resistance force of the prescribed magnitude. Further, while the resistance force of the prescribed magnitude is presented in the above case, the control section 31 repeatedly checks whether or not an angle corresponding to the target position is included between the last-referenced detection result and a currently-referenced detection result (whether or not the target position is exceeded due to control). Then, in a case where the angle corresponding to the target position is included between the last-referenced detection result and the currently-referenced detection result (the target position is exceeded due to control), the control section returns the control of the actuator 231 to the feedback control.

Moreover, in another example, the control information outputted from the information processing apparatus 1 in the present embodiment may include information regarding the target position based on the position of the swing switch 25 (the result of rotation angle detection that is outputted from the actuator 231). In this case, in order to determine the target position, the control section 31 references the control information and the result of rotation angle detection that is outputted from the actuator 231. Then, the control section 31 controls the direction and speed of rotation of the actuator 231 (e.g., the current to be supplied to the actuator 231), according to information regarding the determined target position (information regarding the rotation angle of the actuator 231) and the result of rotation angle detection that is outputted from the rotary encoder 37R.

Further, in the above example, in a case where the result of rotation angle detection that is outputted from the rotary encoder 37R and referenced at the predetermined time intervals does not reach an angle corresponding to the target position within the predetermined period of time after the start of control based on the inputted control information, although the actuator 231 is controlled, the control section 31 may control the direction and speed of rotation (e.g., the current to be supplied to the actuator 231), instead of exercising feedback control, in order to present the prescribed resistance force. In this case, while control is exercised to present the prescribed resistance force as described above, the control section 31 repeatedly checks whether or not an angle corresponding to the target position is included between the last-referenced detection result and the currently-referenced detection result (whether or not the target position is exceeded due to control). Then, in a case where the angle corresponding to the target position is included between the last-referenced detection result and the currently-referenced detection result (the target position is exceeded due to control), the control section 31 returns the control of the actuator 231 to the feedback control.

It should be noted that the magnitude of resistance force against depression can be gradually prescribed when the target position designated by the control information with respect to the position P of the swing switch 25 is P+ΔP (ΔP is a positive or negative value). Thus, the control section 31 may continuously exercise feedback control even in the case where the result of rotation angle detection that is outputted from the rotary encoder 37R and referenced at the predetermined time intervals does not reach an angle corresponding to the target position although the actuator 231 is controlled. In such a case, when the target position is set higher by ΔP than P (set toward a non-depressed side) while the position of the swing switch 25 is P, the presented resistance force is greater than that in the case where the target position is set to P or lower than P (set toward a relatively depressed side). Further, depending on the adopted control method, the magnitude of resistance force can be further prescribed in a gradual manner by changing the value of ΔP. Consequently, in the above example, the control section 31 determines the value of ΔP, according to the prescribed magnitude of resistance force.

In the above example, the control section 31 receives, in advance, from the information processing apparatus 1, information indicating the position where the presentation of force sense starts (the initial position of the leading end of the arm 232). Further, while the amount of depression is greater as compared with that at the position where force sense presentation starts, the control section 31 transmits, to the information processing apparatus 1, the information regarding the amount of depression of the swing switch 25 that is detected by the rotary encoder 37R, and receives information regarding the direction and speed of rotation of the actuator 231 that is transmitted by the information processing apparatus 1 according to the information transmitted from the control section 31. Then, based on the received information, the control section 31 causes the actuator 231 to present the prescribed resistance force by controlling, for example, the current to be supplied to the actuator 231.

Further, the control section 31 may receive, in advance, from the information processing apparatus 1, information indicating the relation between the strength of resistance force and the amount of depression of the swing switch 25 as well as information indicating the position where force sense presentation starts. The information indicating the relation between the strength of resistance force and the amount of depression of the swing switch 25 may prescribe a function that indicates the strength of resistance force according to, for example, the range of amount of depression. More specifically, this information should prescribe as indicated below.

Amount of depression of 0 to 3 degrees: Prescribes $\alpha \cdot P$ as the resistance force according to the amount of depression P (prescribes $\alpha$ as a constant).

Amount of depression of 3 to 5 degrees: Prescribes $\beta$ as the resistance force according to the amount of depression P (prescribes $\beta$ as a constant).

. . . .

Figure 5:
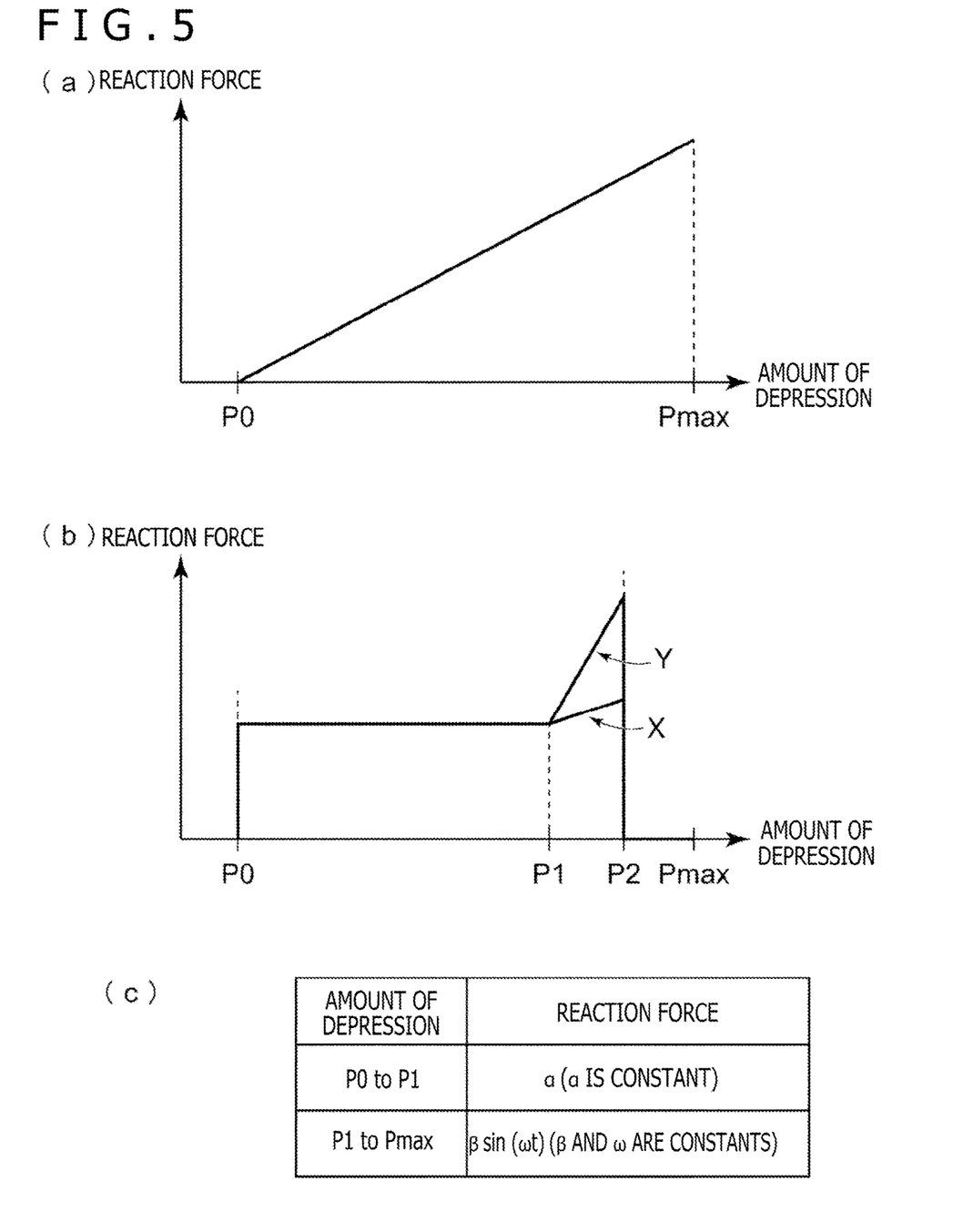
FIG. 5 is a set of explanatory diagrams illustrating detail examples of force sense setting information used by the information processing apparatus according to the embodiment of the present invention.

The information received from the information processing apparatus 1 in the above instance is similar to the earlier-described information prescribing the strength of braking force based on the amount of depression. Setup can be performed by using such information so as to present a reaction force that increases in proportion to the amount of depression that ranges from the amount of depression P0 to the maximum amount of depression Pmax, (or present a constant reaction force) as illustrated, for example, in FIG. 5(a). When such setup is performed, the user can be made to feel a reaction force that increases with an increase in the amount of force applied, for example, to draw a bow (or remains unchanged while the bow is drawn).

Further, setup may be performed as illustrated in FIG. 5(b) so as to present a constant reaction force without regard to the amount of depression while the amount of depression is between P0 and P1, present a reaction force that increases in proportion to the amount of depression while the amount of depression is between P1 and P2 (X or Y in of FIG. 5(b)), and present a reaction force of "0" when the amount of depression exceeds P2. When such setup is performed, the user can be made to feel a substantially constant reaction force while, for example, the user pulls the trigger of a gun (a single-loader), feel an increased reaction force when the user shoots a bullet, and feel as if the trigger is lightened after shooting.

In the example in FIG. 5(b), it is possible to vary the perceived weight of the trigger according to the maximum reaction force presented while the amount of depression is between P1 and P2, and vary a shooting impact perceived when the amount of depression exceeds P2. More specifically, in a case where a maximum reaction force presented while the amount of depression is between P1 and P2 is relatively small (X in FIG. 5(b)), the user feels as if the trigger is relatively light and feels a small shooting impact (feels as if the trigger is drastically lightened). Such an impact is suitable for presenting a force sense in a situation where, for example, a pistol or other small gun is operated.

Further, in a case where the above-mentioned maximum reaction force presented while the amount of depression is between P1 and P2 is relatively great (Y in FIG. 5(b)), the user feels as if the trigger is relatively heavy and feels a great shooting impact. This type of impact presentation is suitable for presenting a force sense in a situation where a shotgun or other powerful gun is operated.

Further, in the above example, the reaction force with respect to a certain amount of depression need not be constant. As indicated, for example, in FIG. 5(c), the presented reaction force may remain constant without regard to the amount of depression while the amount of depression is between P0 and P1, and may periodically vary with the elapsed time t while the amount of depression is between P1 and the maximum Pmax. This setup may be prescribed, for example, by a trigonometric function, and P corresponding to its amplitude and w corresponding to its frequency are only required to be determined in advance, based on the reaction force to be presented. The use of the actuator 231 is advantageous in that a reaction force can be presented even while the user is attempting to keep a constant amount of depression, instead of performing a depression operation as indicated in FIG. 5(c).

In accordance with an instruction indicated above, the control section 31 references the amount of depression of the swing switch 25 that is detected by the rotary encoder 37R, and computes the reaction force to be provided at the current point of time, for example, by substituting (if necessary) a value indicating the current amount of depression into the function prescribed based on the referenced amount of depression. Then, the control section 31 controls the direction and speed of rotation of the actuator 231 or the rotational position of the actuator 231 in order to present the computed reaction force.

[Information Processing Apparatus]

The control section 11 of the information processing apparatus 1 is a program control device such as a central processing unit (CPU), and is configured to operate in accordance with a program stored in the storage section 12. In the present embodiment, the program may be recorded and supplied on a computer-readable, non-transitory recording medium, and stored in the storage section 12. An example of processing performed by the control section 11 in the present embodiment will be described later.

The storage section 12, which is, for example, a disk device or a memory device, stores a program to be executed by the control section 11. Further, the storage section 12 operates as a work memory for the control section 11.

The interface section 13, which is, for example, a USB interface, communicates with a device (e.g., the controller apparatus 2) connected, for instance, with a USB cable, and transmits instructions and data inputted from the control section 11. Further, the interface section 13 outputs information received from a communication partner to the control section 11.

The display control section 14 draws an image in accordance with an instruction inputted from the control section 11, and outputs the drawn image to the display apparatus 3 for display purposes. The sound control section 15 generates a sound waveform in accordance with an instruction inputted from the control section 11, and sounds a sound by outputting the generated sound waveform to the display apparatus 3 or other device having a speaker.

The communication section 16, which is, for example, a network interface or Bluetooth (registered trademark) interface, communicates, for instance, with a wirelessly connected device (e.g., the controller apparatus 2) or an external server, and transmits instructions and data inputted from the control section 11. Further, the communication section 16 outputs information received from a communication partner to the control section 11.

Examples of operations performed by the control section 11 of the information processing apparatus 1 and the control section 31 of the controller apparatus 2 will now be described. The control section 11 in the present embodiment executes, for instance, a game application program and operates as described in the following example.

The control section 11 according to an example of the present embodiment offers, as a process of an application program, a game of shooting a target with a gun, a bow, or other weapon for shooting. Further, in such a game application, the control section 11 presents a force sense based on the weapon when the user depresses the swing switch 25L or the swing switch 25R for shooting purposes. Furthermore, in response to a weapon change operation of switching to a new weapon, the control section 11 switches from a currently used force sense presentation setting to a setting based on the new weapon.

The above operation will now be described in detail. In an example of the present embodiment, the control section 11 of the information processing apparatus 1 receives information regarding the amount of depression of the swing switch 25 from the controller apparatus 2 at predetermined time intervals (e.g., at 1/60 second time intervals). Additionally, when, for example, a button 26 is depressed, the control section 11 of the information processing apparatus 1 receives not only information identifying the depressed button, but also information indicating that the button is depressed, from the controller apparatus 2.

First Example: Shooting

First of all, a game of shooting is described below as an example of operation. In this game, the control section 11 of the information processing apparatus 1 gives an on-screen display to display an image representing a drawn shooting target and an image representing a user-selected weapon. Here, it is assumed that a shotgun is initially selected as the weapon, and that the user is allowed to perform an operation of selecting the shotgun, a bow, a machine gun, or a pistol as the weapon. It is also assumed that each time the button 26 is depressed, the selected weapon changes from the shotgun through the bow, the machine gun, the pistol to the shotgun, and so on.

Stated differently, the example of the present embodiment described here assumes that an operation performed to depress the button 26 is predefined as an operation of changing a force sense setting, and that, each time the button 26 is depressed, the control section 11 switches to a force sense setting different from the force sense setting selected prior to the depression of the button 26.

It should be noted that the operation of changing the force sense setting is not limited to the operation performed to depress the button 26. The force sense setting may alternatively be changed, for example, by tilting the controller apparatus 2 itself or by depressing the button 24, which is to be depressed by a thumb.

Further, no matter what weapon is selected, shooting is performed by depressing the swing switch 25. However, only when the bow is selected, control is exercised so as to start shooting when an operation is performed to release a depressed swing switch 25.

An operation performed by the control section 11 in order to implement the above example will now be described. In the above example, the storage section 12 stores, in advance, information regarding force sense settings for selectable weapons, such as the shotgun, the bow, the machine gun, and the pistol. Here, the force sense setting information represents settings defining the force senses to be presented based on the amount of depression. More specifically, the force sense setting information may be similar to the information for controlling the control section 31 that is illustrated in FIG. 5.

The control section 11 determines the force sense setting information corresponding to the selected weapon as the information indicating the aspect of the force sense to be imparted based on the amount of depression of the swing switch 25, reads the determined force sense setting information from the storage section 12, and transmits the read force sense setting information to the controller apparatus 2. The control section 31 of the controller apparatus 2 then receives the transmitted force sense setting information, and controls the presentation of a force sense in response to the depression of the swing switch 25.

In a scene where, for example, the shotgun is selected, the control section 11 decides to present a force sense with an aspect indicated, for example, at Y in FIG. 5(b), and outputs, to the controller apparatus 2, an instruction for presenting the force sense. Then, in accordance with the instruction and with the amount of depression of the swing switch 25, the control section 31 of the controller apparatus 2 controls the magnitude of the force sense to be presented.

Further, while the swing switch 25 is depressed, information regarding the amount of depression (a value detected by the rotary encoder 37R) is transmitted from the controller apparatus 2 to the information processing apparatus 1 at predetermined time intervals.

According to the information regarding the amount of depression, the control section 11 outputs a vibration waveform for controlling the tactile sense presentation device 34 in the controller apparatus 2. Additionally, the control section 11 controls the sound control section 15 to generate a sound, and further controls the display control section 14 to determine the contents of an image to be displayed.

Specifically, when the information regarding the amount of depression indicates an amount of depression greater than P2 (this occurs in a state where a bullet is shot), the control section 31 of the controller apparatus 2 sets "0" as the force sense to be presented to the swing switch 25 according to a setting received from the information processing apparatus 1. Further, in this instance, the control section 11 of the information processing apparatus 1 determines that the amount of depression is greater than P2, starts a process to be performed when a bullet is shot, selects a predetermined vibration waveform corresponding to a sound generated when the shotgun is fired, and transmits the selected vibration waveform to the controller apparatus 2 as the vibration waveform for controlling the tactile sense presentation device 34.

Further, the control section 11 draws an image illustrating a situation where a bullet is fired from the shotgun, causes the display control section 14 to display the drawn image, uses a predetermined method to determine whether or not a target is hit by the bullet (the predetermined method is not described in detail here because a widely known method is used as the predetermined method), and displays an image based on the determination. When it is determined that the target is hit by the bullet, the control section 11 causes the sound control section 15 to generate a sound indicating the destruction of the target.

As described above, a high realistic sensation is provided by expressing the information regarding the sound to be virtually generated on a side of the hand of the user, in the form of a vibration waveform to be outputted to the controller apparatus 2, and generating a sound emitted at a distant place, for example, with a speaker through the sound control section 15.

Further, upon detecting the depression of the button 26, the control section 11 performs a process of switching the weapon (selecting the next weapon, namely, the "bow"), determines the information regarding a force sense setting corresponding to the selected weapon as the information indicating the aspect of the force sense to be imparted based on the amount of depression of the swing switch 25, reads the determined force sense setting information from the storage section 12, and transmits the read force sense setting information to the controller apparatus 2.

In the above instance, the control section 11 further controls the display control section 14 so as to display an image corresponding to the selected weapon.

The above operation of the control section 11 causes the control section 31 of the controller apparatus 2 to subsequently control the magnitude of the force sense that is based on the amount of depression of the swing switch 25, according to information newly received from the control section 11.

Specifically, the force sense setting corresponding to the bow may be as illustrated in FIG. 5(a). That is to say, when the user depresses the swing switch 25, a reaction force based on the amount of such depression is presented. In this instance, the control section 11 also receives the information regarding the amount of depression of the swing switch 25 at predetermined time intervals, and outputs a predetermined vibration waveform (e.g., a vibration waveform corresponding to a sound effect indicating a change in the tension of a bowstring) to the controller apparatus 2 each time the swing switch 25 is depressed by a predetermined amount. Further, in a case where the change in the amount of depression remains below a predetermined threshold value, the control section 11 outputs a relatively low frequency vibration waveform (a vibration waveform indicating the sway of the whole bow) to the controller apparatus 2.

Consequently, each time the amount of depression is increased while the swing switch 25 is depressed, the sound of the sound effect that is heard when the bow is drawn is presented to the user. Additionally, while an attempt is made to keep a constant amount of depression, a relatively low frequency vibration is presented to the user in order to indicate a situation where a force is applied to keep the bow drawn.

Further, when the user releases the swing switch 25 after it is depressed beyond the predetermined threshold value, the control section 11 detects, at a relatively early time point in relation to a position where the threshold value is exceeded (within a predetermined threshold time), that the amount of depression of the swing switch 25 is changed to "0."

When the amount of depression of the swing switch 25 changes from a value P greater than a predetermined threshold value Pth to "0" within the predetermined threshold time as mentioned above, the control section 11 determines that an operation to shoot an arrow (a shooting operation) is performed, displays an image corresponding to such a situation, and causes the sound control section 15 to generate the sound of a flying arrow as a sound effect. As is the case with a process performed in the case of the shotgun, the control section also determines whether or not a target is hit by the arrow.

Further, in the above instance, the control section 11 may transmit, to the controller apparatus 2, information indicating a setting for selecting the value "0" as the force sense to be presented, without regard to the amount of depression of the swing switch 25. Subsequently, the control section 11 refrains from performing a process (such as a process corresponding to the operation of shooting a bow) in response to an operation of the swing switch 25 until the user newly performs an operation to nock an arrow to the bow (a reload operation). Further, when the reload operation is performed, the control section 11 reads a force sense setting corresponding to the bow from the storage section 12, and transmits the read force sense setting to the controller apparatus 2. It should be noted that the reload operation may be, for example, an operation of tiling the controller apparatus 2 and then returning it to its previous state or an operation of pressing a certain button.

Meanwhile, when the user depresses the swing switch 25 beyond the predetermined threshold value (in a state where the arrow is nocked to the bow) and then gradually decreases the amount of depression of the swing switch 25 to "0," the control section 11 detects that the amount of depression of the swing switch 25 has changed from a depressed position to "0" during a period of time longer than the above-mentioned threshold time.

In the above case, the control section 11 concludes that an operation is not performed to shoot an arrow but is performed to stop shooting, and does not present an image illustrating an arrow shooting operation. Further, in this instance, the control section 31 of the controller apparatus 2 continues performing an operation of presenting a force sense corresponding to the amount of depression even while the amount of depression is decreasing. Thus, the user returns the amount of depression of the swing switch 25 to the previous value while applying a force against a presented reaction force (a force exerted to push the swing switch 25 outward).

As described above, the present embodiment repeatedly acquires the information regarding the amount of depression of the swing switch 25 at predetermined time intervals, and then acquires information regarding temporal changes in the amount of depression, according to the repeatedly acquired information regarding the amount of depression.

Subsequently, based on information regarding the acquired current amount of depression, information regarding temporal changes in the acquired amount of depression, and a prescribed force sense setting, the control section 11 determines the aspect of the force sense to be imparted to the swing switch 25. More specifically, in a case where the temporal changes in the amount of depression indicate that the depressed position returns from a value greater than a predetermined threshold value to "0" within the threshold time as mentioned above, the control section 11 presents a force sense indicating a situation where shooting is performed, and then exercises control so as to refrain from presenting a force sense until a subsequent reload operation is performed. Even if the depressed position returns from the value greater than the predetermined threshold value to "0" in a case where the above-mentioned threshold time is exceeded, the control section 11 does not present a force sense indicating that shooting has been performed, merely presenting a force sense corresponding to the amount of depression while the above-mentioned threshold time is exceeded.

As described above, in the example of the present embodiment, the aspect of force sense presentation also varies with the speed of a depression operation. This makes it possible to improve the quality of experiences on the controller apparatus 2. Further, the present embodiment presents a tactile sense in addition to a force sense, according to the depression operation, and additionally presents, for example, a variety of sounds and images. In this manner, the present embodiment provides comprehensive production.

[Case where Button is Operated while Swing Switch is Depressed]

Moreover, when the button 26 is depressed to change the weapon while the swing switch 25 is depressed, the currently described example of the present embodiment changes the setting of the force sense to be presented to the swing switch 25.

When the aspect of the force sense to be presented (force sense setting) changes during force sense presentation as mentioned above, the control section 11 in the present embodiment may operate in a manner described below. Specifically, in this instance, the control section 11 instructs the controller apparatus 2 not to present a force sense at a point of time when the forced sense setting is changed.

Then, the control section 11 determines whether or not a predefined condition is subsequently satisfied by the amount of depression of the swing switch 25 that is received from the controller apparatus 2. When it is determined that the predefined condition is satisfied, the control section 11 transmits information regarding a new (changed) force sense setting to the controller apparatus 2.

Subsequently, when, for example, the user depresses the button 26 while the user depresses the swing switch 25 to perform a bow drawing operation, the control section 11 of the information processing apparatus 1 performs a process indicating that the weapon is changed to the machine gun. Without regard to the amount of depression of the swing switch 25, the control section 11 transmits, to the controller apparatus 2, information indicating that the force sense to be presented should be set to "0."

Then, the control section 31 of the controller apparatus 2 stops force sense presentation (exercises control so that the user does not feel a reaction force exerted by the arm 232 even when the swing switch 25 is depressed, with the arm 232 lowered to lowest position).

Subsequently, the control section 11 references the information regarding the amount of depression of the swing switch 25 that is inputted at predetermined time intervals, and determines whether or not the predefined condition is satisfied by the amount of depression of the swing switch 25. When the control section 11 determines that the predefined condition is satisfied, the control section 11 reads, from the storage section 12, information regarding a force sense setting corresponding to a selected weapon (the setting corresponding to the machine gun in this instance, that is, the setting indicated in FIG. 5(*c*)), and transmits the read information to the controller apparatus 2.

In the above instance, the predefined condition should be, for example, a condition where the amount of depression is "0" (a condition where a finger of the user is released from the swing switch 25).

Consequently, when the amount of depression of the swing switch 25 is between P0 and P1, the control section 31 of the controller apparatus 2 controls the position of the arm 232 so as to present a constant reaction force without regard to the amount of depression. Meanwhile, when the amount of depression is between P1 and Pmax, that is, the maximum amount of depression, the control section 31 of the controller apparatus 2 determines that shooting is being performed, and periodically changes the position of the arm 232 so as to periodically change the reaction force. It should be noted that, as processing during such shooting, the control section 11 performs processing on the assumption that bullets are intermittently fired, and executes a process, for example, of causing the display control section 14 to display an image illustrating such intermittent firing.

As described above, according to the present embodiment, when an instruction is newly issued to switch from a predetermined force sense setting to a different force sense setting while a certain force sense is being presented based on the predetermined force sense setting, force sense presentation may be stopped until a predefined condition is satisfied, that is, a finger of the user is released, for example, from a switch presented with a force sense (the switch is left unoperated). Then, after the predefined condition is satisfied, force sense presentation processing may be resumed according to a new force sense setting (the above-mentioned different force sense setting).

Further, the above-mentioned condition is not limited to a condition where the user is not engaged in operation, and may be a condition where a predetermined period of time has elapsed.

REFERENCE SIGNS LIST

1: Information processing apparatus
2: Controller apparatus
3: Display apparatus
11: Control section
12: Storage section
13: Interface section
14: Display control section
15: Sound control section
16: Communication section
21: Grip section
22: Main body section
23: Joystick
24: Button
25: Swing switch
26: Button
31: Control section
32: Microphone
33: Speaker
34: Tactile sense presentation device
36: Communication section
37: Sensor section
231: Actuator
232: Arm
250: Switch cover
251: Rotation shaft
252: Support

The invention claimed is:

1. An information processing apparatus that is to be connected to a controller including a push-button and a force sense presentation section, the push-button being adapted to move between a first position and a second position when depressed by a finger of a user, the force sense presentation section presenting a force sense to the push-button, the information processing apparatus comprising:

processing circuitry configured to
  determine, according to a prescribed force sense setting, an aspect of a force sense to be imparted to the push-button;
  control the force sense presentation section of the controller apparatus, according to the determination; and
  each time a predefined operation of changing the force sense setting is performed, change the force sense setting to be used from a current force sense setting to a different force sense setting.

2. The information processing apparatus according to claim 1, wherein the processing circuitry is further configured to
  repeatedly acquire information regarding an amount of depression of the push-button at predetermined time intervals, and
  acquire information regarding temporal changes in the amount of depression, according to the repeatedly acquired information regarding the amount of depression, and determine the aspect of the force sense to be imparted to the push-button, according to the acquired information regarding a current amount of depression, the acquired information regarding the temporal changes in the amount of depression, and the prescribed force sense setting.

3. The information processing apparatus according to claim 2, wherein, when the force sense setting is changed, the processing circuitry is further configured to refrain from presenting a force sense during a time interval between an instant at which the force sense setting is changed and an instant at which the acquired amount of depression satisfies a predefined condition.

4. The information processing apparatus according to claim 1, wherein the force presentation section includes an arm rotated by an actuator, the arm rotating within a predetermined angular range around a rotation shaft.

5. The information processing apparatus according to claim 4, wherein the processing circuitry is further configured to
  successively change a target position of the arm by varying a magnitude of a reaction force to be presented to the user.

6. The information processing apparatus according to claim 1, wherein the force presentation section includes a brake.

7. The information processing apparatus according to claim 6, wherein the processing circuitry is further configured to
  receive, in advance, information prescribing a relationship between a strength of braking by the brake and the amount of depression.

8. A method for controlling an information processing apparatus that is to be connected to a controller including a push-button and a force sense presentation section comprising an actuator rotated by an arm, the push-button being adapted to move between a first position and a second position when depressed by a finger of a user, the force sense presentation section presenting a force sense to the push-button, the method comprising:
  determining, according to a prescribed force sense setting, an aspect of a force sense to be imparted to the push-button;
  controlling the force sense presentation section of the controller, according to the determination; and
  each time a predefined operation of changing the force sense setting is performed, changing the force sense setting from a current force sense setting to a different force sense setting.

9. The method of claim 8, further comprising:
  repeatedly acquiring information regarding an amount of depression of the push-button at predetermined time intervals; and
  acquiring information regarding temporal changes in the amount of depression, according to the repeatedly acquired information regarding the amount of depression, and determining the aspect of the force sense to be imparted to the push-button, according to the acquired information regarding a current amount of depression, the acquired information regarding the temporal changes in the amount of depression, and the prescribed force sense setting.

10. The method of claim 8, further comprising:
  in response to the force sense setting is changed, refraining from presenting a force sense during a time interval between an instant at which the force sense setting is changed and an instant at which the acquired amount of depression satisfies a predefined condition.

11. A non-transitory computer-readable storage medium storing computer-readable instructions thereon for an information processing apparatus that is to be connected to a controller including a push-button and a force sense presentation section comprising an actuator rotated by an arm, the push-button being adapted to move between a first position and a second position when depressed by a finger of a user, the force sense presentation section presenting a force sense to the push-button, the computer-readable instructions performing a method, the method comprising:
  determining, according to a prescribed force sense setting, an aspect of a force sense to be imparted to the push-button;
  controlling the force sense presentation section of the controller, according to the determination; and
  each time a predefined operation of changing the force sense setting is performed, changing the force sense setting to be used by the determination means from a current force sense setting to a different force sense setting.

12. The non-transitory computer-readable storage medium of claim 11, further comprising:
  repeatedly acquiring information regarding an amount of depression of the push-button at predetermined time intervals; and
  acquiring information regarding temporal changes in the amount of depression, according to the repeatedly acquired information regarding the amount of depression, and determining the aspect of the force sense to be imparted to the push-button, according to the acquired information regarding a current amount of depression, the acquired information regarding the temporal changes in the amount of depression, and the prescribed force sense setting.

13. The non-transitory computer-readable storage medium of claim 11, further comprising:
  in response to the force sense setting is changed, refraining from presenting a force sense during a time interval between an instant at which the force sense setting is changed and an instant at which the acquired amount of depression satisfies a predefined condition.

* * * * *